United States Patent [19]

Dunweg et al.

[11] Patent Number: 5,505,859
[45] Date of Patent: Apr. 9, 1996

[54] HOLLOW FIBER FOR DIALYSIS AND PROCESS OF MANUFACTURING

[75] Inventors: Gustav Dunweg; Hans G. Breidohr; Ulrich Baurmeister, all of Wuppertal; Hans G. Tilgner, Mulheim am Rhein; Uwe Stein, Wuppertal, all of Germany

[73] Assignee: Akzo NV, Netherlands

[21] Appl. No.: 196,100

[22] PCT Filed: Aug. 7, 1992

[86] PCT No.: PCT/EP92/01801

§ 371 Date: Feb. 17, 1994

§ 102(e) Date: Feb. 17, 1994

[87] PCT Pub. No.: WO93/03829

PCT Pub. Date: Mar. 4, 1993

[30] Foreign Application Priority Data

Aug. 17, 1991 [DE] Germany .......................... 41 27 278.1

[51] Int. Cl.$^6$ ............................ B01D 33/21; B01D 39/00
[52] U.S. Cl. ................ 210/500.23; 210/500.29; 210/500.35; 210/500.36; 210/490; 264/178 R; 264/199; 264/200; 96/6
[58] Field of Search .................. 210/500.23, 500.29, 210/500.3, 500.32, 500.33, 500.35, 500.36, 490; 264/199, 178 R, 200, 177.14, 177.11, 187; 96/6; 428/397

[56] References Cited

U.S. PATENT DOCUMENTS

| | | | |
|---|---|---|---|
| 3,888,771 | 6/1975 | Isuge et al. | 210/500.29 |
| 4,332,752 | 6/1982 | Henne et al. | 264/199 |
| 4,535,028 | 8/1985 | Yokugi et al. | 210/500.23 |
| 4,668,396 | 5/1987 | Baurmeister et al. | 210/500.29 |
| 4,713,292 | 12/1987 | Takemura et al. | 210/500.29 |
| 4,741,927 | 5/1988 | Pelger et al. | 210/500.24 |
| 4,772,393 | 9/1988 | Pelger et al. | 210/500.29 |
| 4,872,982 | 10/1989 | Taylor | 210/500.29 |
| 4,882,060 | 11/1989 | Schmer | 210/500.29 |
| 4,919,809 | 4/1990 | Yamamoto et al. | 210/500.29 |
| 4,933,084 | 6/1990 | Bandel et al. | 210/500.29 |
| 4,981,959 | 1/1991 | Diamantoglou | 536/124 |
| 4,981,960 | 1/1991 | Diamantoglou | 536/56 |
| 4,997,935 | 3/1991 | Diamantoglou | 536/56 |
| 5,035,801 | 7/1991 | Schmer | 210/490 |
| 5,063,009 | 11/1991 | Mizutani et al. | 210/500.29 |
| 5,093,486 | 3/1992 | Diamantoglou | 536/20 |
| 5,093,488 | 3/1992 | Diamantoglou | 536/56 |
| 5,093,489 | 3/1992 | Diamantoglou | 536/124 |
| 5,171,444 | 12/1992 | Diamantoglou et al. | 210/500.23 |
| 5,192,440 | 3/1993 | Von Sengbusch | 210/500.29 |

FOREIGN PATENT DOCUMENTS

| | | |
|---|---|---|
| 0076442 | 4/1983 | European Pat. Off. . |
| 0135593 | 4/1985 | European Pat. Off. . |
| 0175948 | 4/1986 | European Pat. Off. . |
| 2328853 | 12/1973 | Germany . |
| 2906576 | 1/1985 | Germany . |
| 261041 | 10/1988 | Germany . |
| 2032340 | 5/1980 | United Kingdom ............... 210/500.29 |

OTHER PUBLICATIONS

Chenoweth, D. E., "Biocompatibility of Hemodialysis Membrane—Evaluation with C3a Anaphylatoxin Radioimmunoassays," *asaio Journal,* Apr./Jun. 1984, pp. 44–49.

Chenoweth, D. E., et al., "Anaphylatoxin formation during hemodialysis: Effects of different dialyzer membranes," *Kidney International,* vol. 24 (1983), pp. 764–769.

Primary Examiner—Ana M. Fortuna
Attorney, Agent, or Firm—Oliff & Berridge

[57] ABSTRACT

A dialysis membrane is made of a regenerated cellulose polymer in the form of a hollow fiber with a continuous internal cavity filled essentially with a gas. The hollow fiber has a porous inner and an outer surface. The outer surface of the hollow fiber is formed by a thin skin which has fine lengthwise grooves. The inner surface of the hollow fiber is positively modified by physical and/or chemical means.

The invention also includes a method for manufacturing such a dialysis membrane.

36 Claims, 4 Drawing Sheets

HOLLOW FIBER FOR DIALYSIS AND PROCESS OF MANUFACTURING

BACKGROUND OF THE INVENTION

Hollow cellulose fibers in which the cellulose is regenerated from cuoxam solutions are known for example from DE-A-23 28 853.

DE-C-29 06 576 teaches a method for spinning hollow fibers from regenerated cellulose for semipermeable membranes by extruding a cellulose-cuoxam solution through the annular slit of a hollow-fiber spinneret into an aqueous soda lye and extruding a cavity-forming fluid through the internal bore of the hollow-fiber spinneret and by conventional aftertreatment. Locating the hollow-fiber spinneret in the bottom of the coagulation tank is less favored because of technical problems in sealing and beginning spinning.

In order to avoid the known problems that can arise in using cavity-forming fluids to produce hollow fibers, it has already been proposed to use gases to form the internal cavity.

Thus, EP-B-0 076 442 teaches a method for manufacturing a hollow fiber from regenerated copper ammonium cellulose with an axially disposed cylindrical bore extending over the length of the fiber. The bore is filled exclusively with gas and contains no contaminants. EP-B-0 teaches a method with the following steps.

1) Extruding a spinning solution of copper ammonium cellulose through an annular opening, and forming a fiber extrudate with a bore, while gas is blown simultaneously into the fiber extrudate into the bore of the fiber through a blow tube located in the center of the annular opening;

2) Dropping the fibers in free fall in an air chamber and dipping them essentially perpendicularly to a depth of 2 to 20 mm, possibly also to a depth of up to 30 mm, below the surface of a coagulation bath only under the influence of a force directed downward and produced during free fall;

3) Guiding the fiber extrudate through the coagulating bath, producing a hollow fiber with an axially disposed cylindrical bore; and 4) Refining and drying the hollow fiber thus obtained.

The long air gap required for this purpose requires spinning solutions with a high viscosity. In addition, considerable difficulties arise in connection with the requirement of dipping the fiber in free fall up to 20 ml or possibly up to 30 ml deep in the coagulating bath. Dry elongation of such hollow fibers is approximately 40% and wet elongation is 70%, as is usual for conventionally spun hollow fibers as well.

Since the hollow fibers are produced from pure cellulose, the biocompatibility properties are much worse than for membranes that have been slightly modified for example. In addition, since materials that could be termed contaminating internal fluids under normal circumstances must not be present on the inside of the internal cavity, this rules out the possibility of improving biocompatibility by coating with suitable polymers usually ranked as contaminants. Substances that react with cellulose are likewise not provided according to this document.

DD-A-261 041 discloses a capillary hollow membrane made of regenerated cellulose (viscose) for liquid-phase permeation, with the internal cavity being formed by a gas or a liquid. Conventional viscoses with a high tendency to coagulate and the use of mildly coagulating precipitation baths characterizes the production of such hollow capillary membranes.

EP-A-0 135 593 teaches a hollow fiber for dialysis made of cuproammonium cellulose, which has a skin on the outside and no pores whatsoever on the inner surface. Elongation of such hollow fibers occurs in the range from +1.0 to −5.0%.

EP-B-0 175 948 describes the manufacture of non-stretched hollow fibers for dialysis by coagulating a cuproammonium cellulose solution with a cellulose concentration of 6.0 to 8.7 wt. % and a viscosity of 500–1300 poises (20° C.), which has a film structure with a porosity of 15–25%, whose pores have a diameter of 25–40 Å, and whose ultrafiltration rate (UFR) is 3.0–5.5 ml/h·m$^2$·mmHg. The film structure must be essentially skin-free and essentially pore-free on the internal surface.

A major problem in dialysis is "biocompatibility," described below.

Tolerance of hemodialysis in patients is affected by various factors such as the physical and mental state of the patient, the sterile environment, and especially the dialyzer, with the biocompatibility of the hollow fiber in the dialysis module being an important factor. In addition, the surface properties of the polymer, the membrane structure, and the dialyzer design have a significant influence on biocompatibility in dialysis treatment.

The chemically different structures of the various polymers play an important role in biocompatibility, as for example in complement activation (C5$a$ formation), hemolysis, and thrombogenesis.

In addition to the fact that dialysis membranes made of synthetic or natural polymers, when used in artificial kidneys, can very easily cause blood clotting which is largely prevented by suitable treatment with drugs, there is another effect that frequently occurs in dialysis membranes made of regenerated cellulose. Specifically when treating a kidney patient using a dialyzer with cellulose membranes a transient decrease in the number of leucocytes can occur at the beginning of dialysis treatment. This effect is known as leucopenia and must be at least largely suppressed or prevented by modifying the membrane.

Leucopenia in dialysis is most strongly evident 15 to 20 minutes after the start, when the neutrophils (in other words, the leucocytes that can be stained with neutral dyes or simultaneously with acid and basic dyes) can disappear almost completely. Then the number of leucocytes recovers within about 1 hour, back to nearly the initial value or even above the latter.

If a new dialyzer of the same kind is connected after the leucocytes recover, leucopenia again occurs to the same degree.

Cellulose membranes cause pronounced leucopenia. Although the clinical significance of leucopenia has not yet been scientifically explained, it is desirable to have a dialysis membrane for hemodialysis that does not show the effect of leucopenia but does not adversely affect the other highly desirable properties of dialysis membranes made of regenerated cellulose.

In hemodialysis using membranes made of regenerated cellulose, pronounced complement activation has been observed along with the leucopenia. The complement system within the blood serum is a complex plasma enzyme system composed of many components which works in different ways to defend against injury by invading foreign cells (bacteria, etc.). If antibodies against the invading organism are available, activation is possible in a complement-specific manner by the complex of antibodies with antigen structures of the foreign cells, otherwise complement activation takes place along an alternative path through special surface features of the foreign cells. The complement system is based on a number of plasma proteins. After activation, these proteins react specifically with one another in a certain sequence and finally a cell-damaging complex is formed which destroys the foreign cell.

Peptides are released from individual components, triggering inflammation phenomena and possibly also having undesired pathological consequences for the organism. It is assumed that activation in hemodialysis membranes made of regenerated cellulose takes place via the alternative path. These complement activations have been determined objectively by detection of complement fragments C3a and C5a.

Reference is made in this connection to the following papers: D. E. Chenoweth et al., Kidney International, Volume 24, Pages 764 et seq., 1983 and D. E. Chenoweth, Asaio-Journal, Volume 7, Pages 44 et seq., 1984.

Although the clinical significance of complement activation has not yet been explained, efforts are made to exclude it as much as possible in hemodialysis.

SUMMARY OF THE INVENTION

The goal of the present invention is to provide a dialysis membrane characterized by the fact that its properties can be adapted to as many dialysis parameters as possible and that it is economical to manufacture and process.

This goal is achieved by dialysis membranes and methods according to the present invention.

The invention relates to a dialysis membrane made from a regenerated cellulose polymer in the form of a hollow fiber with a continuous internal cavity essentially filled with a gas. The hollow fiber has a porous internal and external surface. The invention also relates to a method for manufacturing such a hollow fiber for dialysis from a solution of a member selected from the group consisting of cellulose, cellulose derivatives, chitin, chitin derivatives and mixtures thereof. The concentration of polymers in the solution is 4 to 16 wt. % relative to the weight of the solution and a continuous internal cavity is formed in the hollow fiber by a fluid containing a gas.

DETAILED DESCRIPTION OF PREFERRED EMBODIMENTS

Modified celluloses like those described herein can be used to manufacture dialysis membranes according to the invention:

U.S. Pat. Nos. 4,981,960; 5,093,489; 4,997,935; 5,093,488; 4,981,959; 5,093,486; 4,668,396; 4,741,927; 4,772,393; 4,882,060; 5,035,801 and 5,171,444 all of which are hereby incorporated by reference.

The invention will now be explained and described in greater detail with reference to the figures and embodiments.

Figure 4:
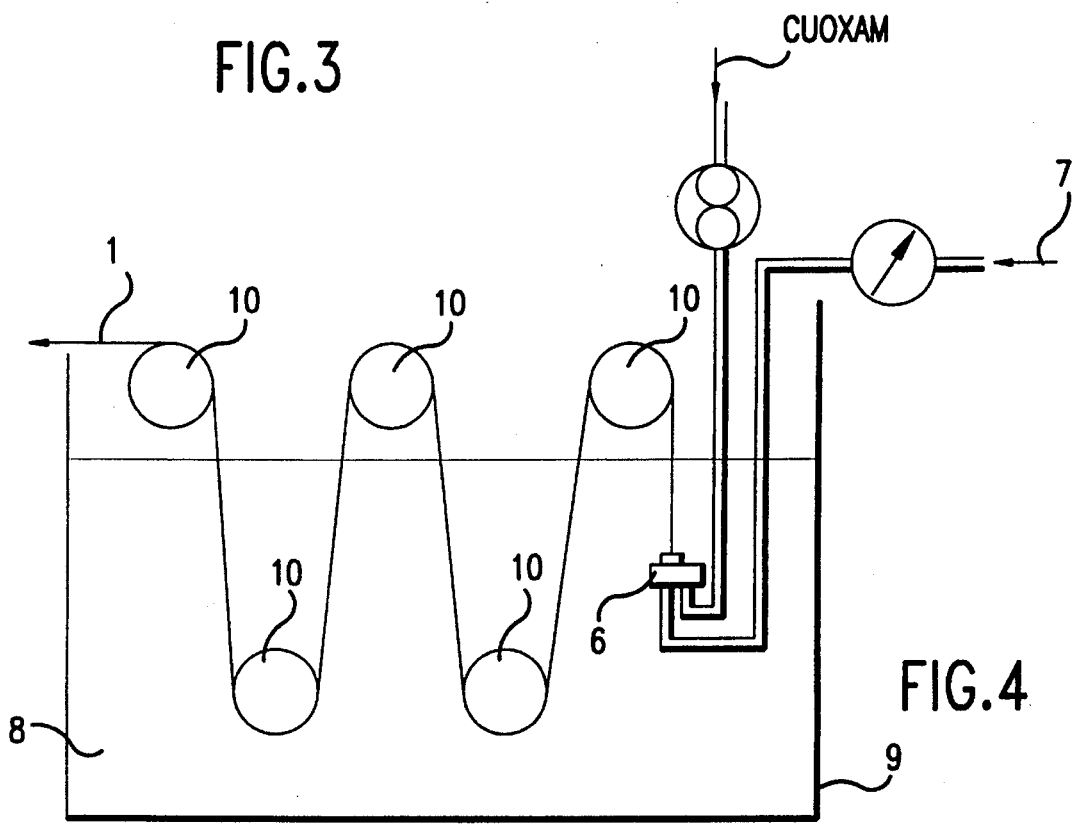
FIG. 4 shows a spinning arrangement in which features of the method according to the invention are shown.

FIG. 4 shows a spinning arrangement in which the essential features of the method according to the invention are shown.

FIGS. 5 to 10 show field-effect scanning electron photomicrographs of the hollow fibers according to the invention.

The schematic diagrams (not to scale) in FIGS. 1 to 4 were chosen because the special details of the embodiments would be difficult to see in a representation that was to scale.

Figure 1:
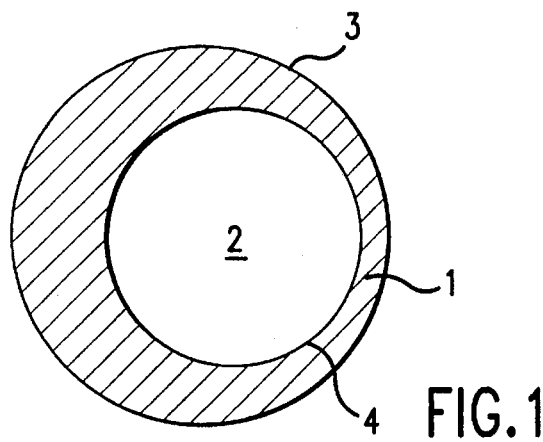
FIGS. 1, 2, and 3 show hollow fiber membranes according to different embodiments of the invention.

FIG. 1 shows a cross section of a hollow fiber 1 according to the invention with a continuous circular internal cavity 2, filled essentially with a gas. Reference numeral 3 refers to the outer surface of hollow fiber 1, which likewise has a circular outer cross section. Outer surface 3 is formed by a thin skin and has fine lengthwise grooves. Hollow fiber 1 has an inner surface 4 positively modified by physical and/or chemical means.

Outer surface 3 of hollow fiber 1 can be concentric with respect to the internal cavity or, as shown in FIG. 1, can be located eccentrically with respect to internal cavity 2. The midpoints of circular internal cavity 2 and circular surface 3 in this embodiment are spaced apart from one another, so that, in a clearly visible manner, an area of maximum thickness of the hollow fiber wall composed of cellulose material merges continuously with an area of minimum wall thickness.

Figure 2:
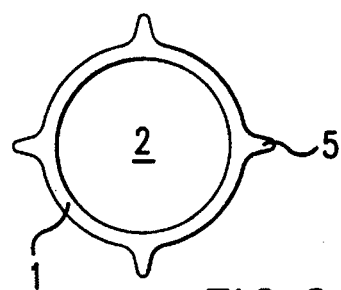

FIG. 2 shows another possible shape design for the dialysis membranes according to the invention. The membrane wall of hollow fiber 1, made of cellulose regenerated from cuoxam solutions, has a circular internal cavity 2, while the outer surface has four symmetrically arranged lengthwise ribs 5.

Figure 3:
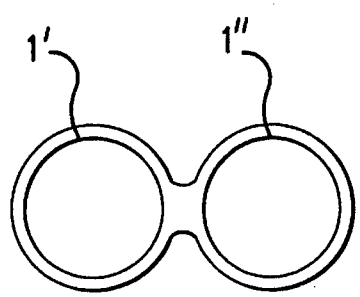

FIG. 3 shows the cross section of a dialysis membrane made of two circular hollow fibers connected by a rib.

In the spinning diagram (FIG. 4), the cuoxam spinning solution is supplied by a spinning pump to the spinning slits of a spinneret 6 located at the bottom of a coagulating bath 8. The central bore of spinneret 6 receives fluid 7 for forming the internal cavity, said fluid consisting at least 80% and preferably at least 90% of a gas.

For example, the fluid forming the internal cavity may consist of at least 80 vol. % of an inert gas and up to 20 vol. % of a gas, a liquid, or a mixture of a gas and a liquid which reacts with the cellulose spinning solution after being forced through the spinneret. This reaction influences the surface structure of the internal cavity. In a preferred embodiment, the internal cavity consists of at least 90 vol. % of an inert gas and up to 10 vol. % of a gas, a liquid or a mixture of a gas and a liquid which reacts with the cellulose spinning solution after being forced through the spinneret. The fluid forming the internal cavity may, for example, be a mixture of nitrogen and a member selected from the group consisting of ethylene oxide, propylene oxide and mixtures thereof; a mixture of nitrogen and a member selected from the group consisting of ethylene, propylene and mixtures thereof; a mixture of nitrogen and a member selected from the group consisting of acrylic acid, acrylate and mixtures thereof; and a mixture of nitrogen and diisocyanate. The fluid forming the internal cavity may be a mixture of air or nitrogen and volatile liquids, the mixture of air or nitrogen serving as a carrier gas for the volatile liquids. For example, the volatile liquid may be a glycerine-alcohol mixture. The fluid forming the internal cavity may be a gas with a liquid finely distributed in it. For example, the finely distributed liquid may consist of modified cellulose dissolved in a suitable solvent. In an embodiment, the gas with a liquid finely distributed in it is an aerosol.

The fluid forming the internal cavity of the hollow fiber is forced through the internal bore of the spinneret 6 with a pressure differential of 100–450 Pa relative to the sum of the static pressure and atmospheric pressure. In coagulating bath 8, contained for example in a tub 9, the stream of solution arising from the spinneret directly into the coagulating bath is coagulated and solidified. After sufficient solidification, the forming hollow fiber 1 can be guided over rollers 10 to ensure sufficient residence time in the coagulating bath.

Figure 5:
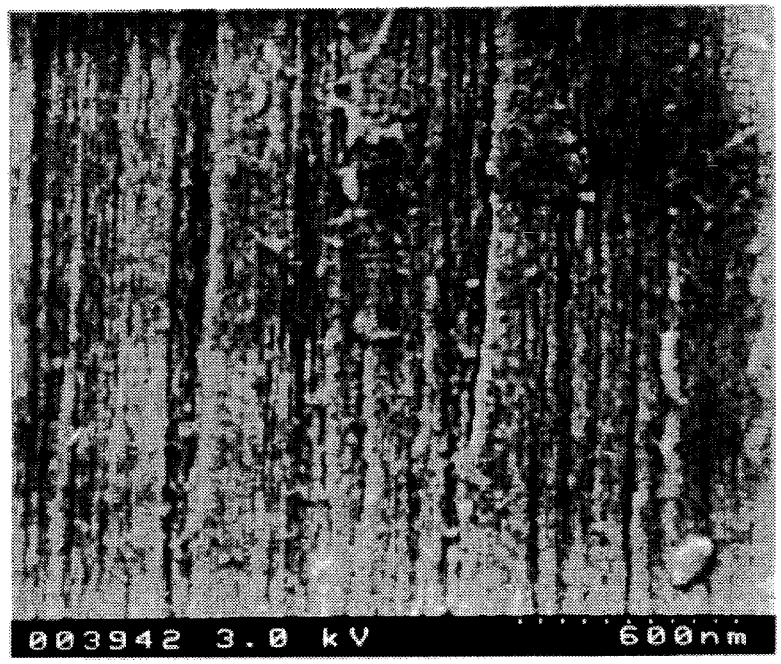
FIGS. 5–10 show field-effect scanning electron photomicrographs of hollow fibers according to the invention.
Figure 6:
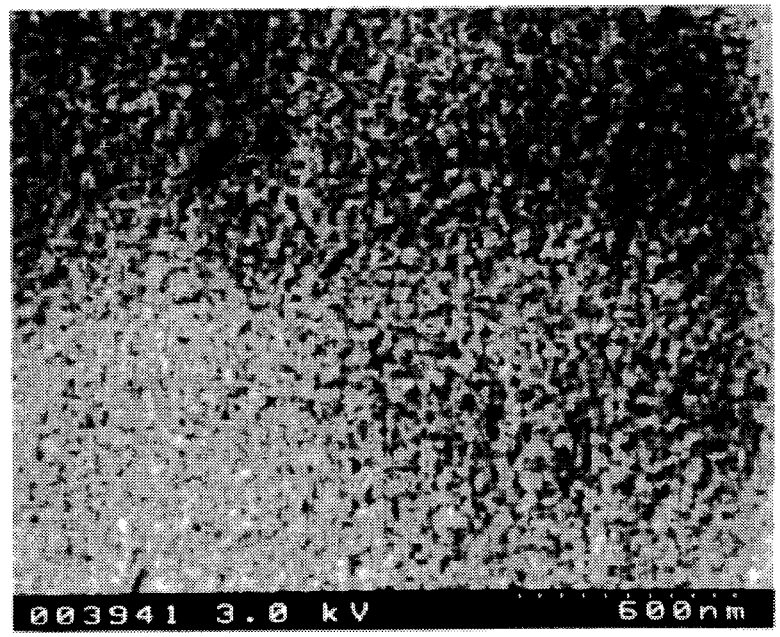

FIG. 5 shows a field-effect scanning electron photomicrograph with 45,000 × magnification of an outside wall of the hollow fiber according to the invention, while FIG. 6 shows the inside wall of the same hollow fiber at the same magnification (Example 1).

Figure 7:
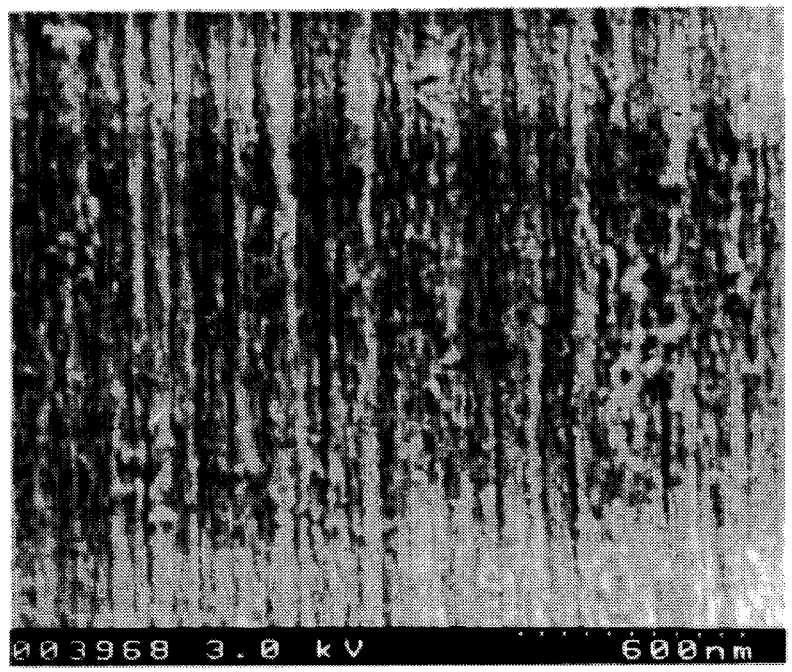
Figure 8:
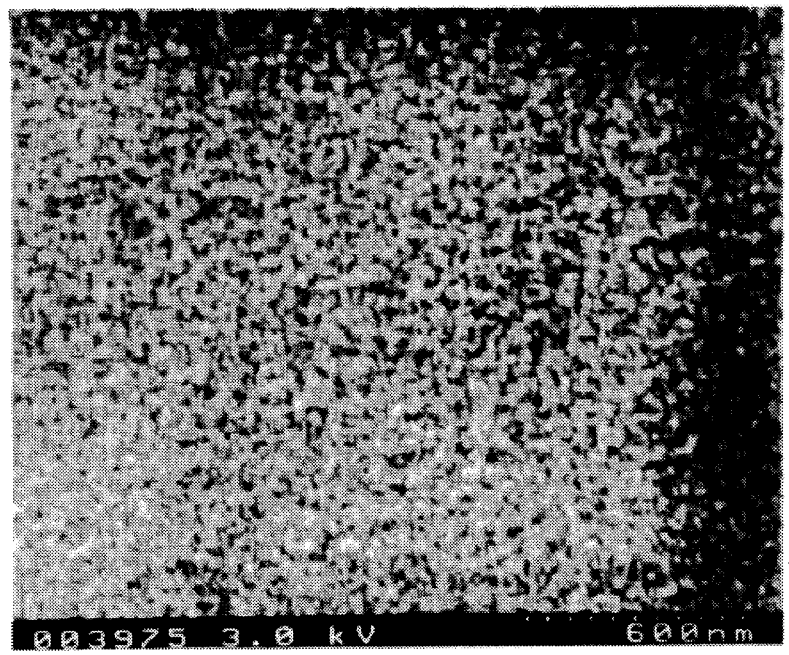

FIGS. 7 and 8 are corresponding field-effect scanning electron photomicrographs at the same magnification, but with hollow fibers according to the invention which contain a small amount of modified cellulose (Example 3).

Figure 9:
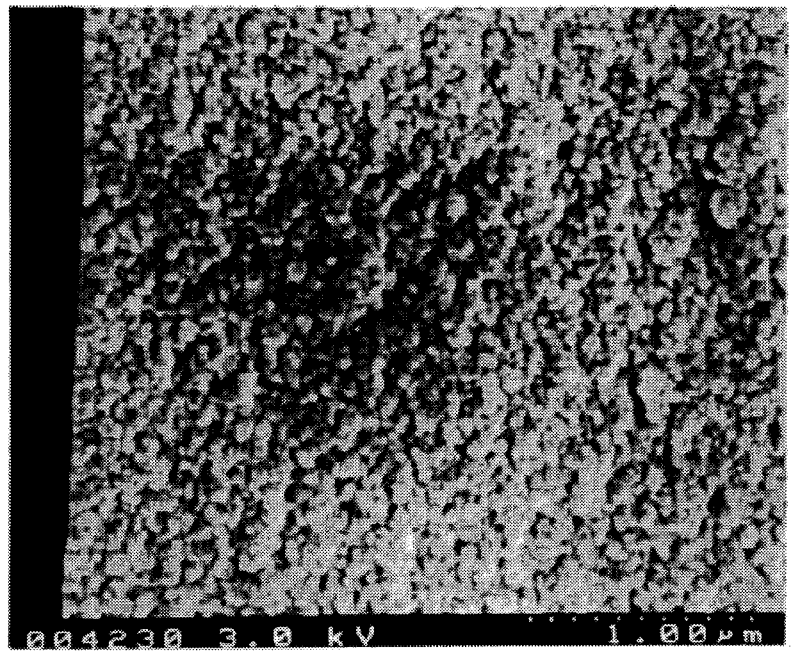

FIG. 9 shows a field-effect scanning electron photomicrograph of the surface of the break in the vicinity of the inside, edge of the hollow fibers shown in a top view in FIG. 5 magnified 27,000:1.

Figure 10:
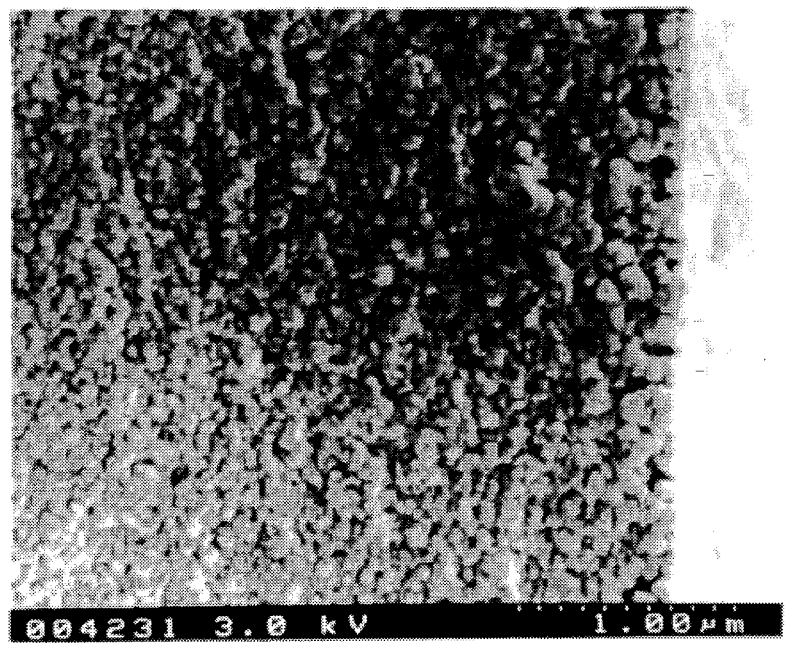

FIG. 10 shows an field-effect scanning electron photomicrograph corresponding to FIG. 9, but of the break surfaces in the vicinity of the outside edge of the same hollow fiber at the same magnification.

The invention will now be described in greater detail with reference to the following examples.

Example 1

A hollow fiber spinneret of known design with an outlet cross section for the wall-forming cuoxam spinning solution of 0.08 mm$^2$ is placed in a coagulating bath according to FIG. 4 in such fashion that the outlet openings point vertically and the outlet surface is parallel to the surface of the coagulating bath.

The coagulating bath contains 140 g/l NaOH, 6 g/l ammonia, and 0.8 g/l Cu in water at 20° C. The depth of the bath between the outlet cross section of the spinneret and the surface of the bath is 18 cm. By means of a gear-type metering pump, 6.0 ml/min cuoxam spinning solution is delivered through the annular slit of the hollow fiber spinneret, with a concentration of 9.0% cellulose, 8.0% ammonia, and 3.8% Cu, while at the same time 2.2 ml/min nitrogen at a pressure of 22 mbar is delivered through the internal filling supply line to the interior of the hollow fiber as it forms.

The wall-forming cuoxam spinning solution solidifies immediately above the outlet opening, forming the Norman connection, and can then be conveyed further without risk of deformation. The hollow-forming gas prevents collapse of the hollow fiber which is still very soft at the outset. Since the spinning solution and gas emerge simultaneously from the spinneret, a very light clump of coagulate is formed relative to the coagulating bath and comes loose from the spinneret after 2 to 5 seconds, rising to the surface of the coagulating bath along with the following hollow fiber, now correctly dimensioned. The start of spinning is considerably facilitated by taking advantage of buoyancy.

The coagulate floating on the surface of the bath is guided, with deflection, through the second section of the coagulating bath for complete solidification and then through the decoppering and deacidifying washing baths.

At the end, the hollow fiber, now composed of pure cellulose, passes through a softening bath containing 10 g/l glycerine and 400 g/l isopropyl alcohol in water and then dried on a roller dryer at 75°–80° C. contact temperature to a water content of 10%.

This is followed by winding as required on a cross-wound bobbin or, after applying an ondulation, on a bundle-winding machine.

During all of the processing steps, only the gas added at manufacture remains in the interior of the hollow fiber.

The finished hollow fiber has the desired concentric shape, but with greater uniformity than when using an air gap and spinning from top to bottom, since the influences of differences in viscosity, air movements, and surface tension which have a negative effect under those conditions are avoided.

While the extrusion rate of the spinning solution at the spinneret is 75.0 m/min, the speed of the first deflection point above the coagulating bath is 71 m/min, and the speeds of the following baths increase in very small amounts to compensate for friction.

Drying takes place at a rate that decreases from one roller to the next, in order to permit unimpeded shrinkage as water is lost.

Hollow fibers thus produced have a wall thickness of 8 microns and an inside diameter of 200 microns.

The tensile strength is 110 cN and the elongation at break is 52% when dry and 102% when wet.

Test bodies made from these hollow fibers exhibit the following performance data:

Ultrafiltration rate=5.8 ml/min·m$^2$·mmHg

Dialysis rate, vitamin $B_{12}$=7.2 cm/min·$10^{-3}$

Dialysis rate, creatinine=52.0 cm/min·$10^{-3}$

Thanks to stress-free manufacture, these values are markedly above comparable values for a cuprophan hollow fiber of the conventional type.

Example 2

In a spinning device according to Example 1, a spinneret was used with an outlet cross section of 0.12 mm$^2$ and a spinning solution with the following concentrations:

6.35% cellulose, 8.0% ammonia, and 2.65% Cu.

The extruded spinning solution volume is 6.5 ml/min, and the gas volume is 1.6 ml/min at a pressure of 22 mbar. The immersion depth is unchanged (18 cm) and the concentration of the coagulating bath is 140 g/l NaOH, 6 g/l ammonia, and 0.8 g/l Cu in water at 20° C.

The escape velocity at the spinneret is 59.2 m/min while the rate of the second deflection is 50.2 m/min. Transport of the hollow fiber through the other treatment baths again takes place with minimum possible tension. The ratio of liner rise rate of the stream to scape speed from the spinneret is from about 0.90 to about 0.96.

The aftertreatment bath contains 80 g/l glycerine and 400 g/l isopropyl alcohol in water and the drying temperature is 75° to 95° C.

Finishing takes place as in Example 1.

The hollow fiber thus obtained has a tensile strength of 70 cN and an elongation at break of 56% dry and 110% wet.

The wall thickness is 16 μm and the inside diameter is 205 μm. The following performance data were measured on these hollow fibers:

Ultrafiltration rate=56 ml/min·m$^2$·mmHg

Dialysis rate, vitamin $B_{12}$=14.8 cm/min·$10^{-3}$

Dialysis rate, creatinine=58.0 cm/min·$10^{-3}$

The filtration coefficient for cytochrome c was 0.86, for albumin 0.06.

Example 3

In a spinning device according to Example 2, a spinning solution is used whose cellulose is composed 95% of pure linters cellulose and 5% of diethylaminoethylcellulose with a degree of substitution of 0.4. The nitrogen content of the regenerate is 0.14%. The other conditions remain unchanged.

Hollow fibers thus produced have the following data:

Wall thickness 16.5 μm, inside diameter 202 μm

Elongation at break 52% dry and 106% wet

Tensile strength 68 cN

Ultrafiltration rate=59.0 ml/min·m$^2$·mmHg

Dialysis rate, vitamin $B_{12}$=16.3 cm/min·$10^{-3}$

Dialysis rate, creatinine=56.0 cm/min·$10^{-3}$

Filtration coefficient, cytochrome c=0.88

Filtration coefficient, albumin=0.08

Reduction of C5a complement activation approximately 68%.

Example 4

Under the same conditions as Example 3, a spinning solution is used whose cellulose consists of 94% pure linters cellulose, but 6% benzyl cellulose with a benzylation ratio of 1:0.23. The hollow fibers obtained have the following data:

Wall thickness 15.4 μm, inside diameter 202 μm

Tensile strength 76 cN

Elongation at break 51% dry and 100% wet

Ultrafiltration rate=51.0 ml/min·m$^2$·mmHg

Dialysis rate, vitamin $B_{12}$=14.8 cm/min·$10^{-3}$

Dialysis rate, creatinine=59.0 cm/min·$10^{-3}$

Filtration coefficient, cytochrome c=0.85

Filtration coefficient, albumin=0.04

Reduction of C5a complement activation approximately 78%.

Example 5

To reduce albumin permeability and lessen the risk of back filtration and endotoxin introduction when using highly permeable membranes under hemofiltration conditions, a hollow fiber membrane is produced which contains on its inside, in contrast to conventional hollow fiber membranes, a discrete layer of higher material density.

This effect is achieved under the conditions of Example 3, but with an internal filling gas composed of 80 vol. % nitrogen and 20 vol. % sulfur dioxide. The volumes of gas used and the wall-forming spinning solution remain unchanged, as do the subsequent aftertreatment steps.

The sulfur dioxide supplied with the nitrogen is precipitated on the inside wall as sulfurous acid.

While in conventional methods precipitation begins on the outside wall, where a denser layer is formed, and the rest of the wall retains its relatively uniform porous structure, in this case a layer 1 to 3 μ thick is also formed on the inside wall.

The total wall thickness decreases by 1 μ to 15.5 μ, while the inside diameter remains 200 μ.

While UFR decreases slightly to 52 ml/min·m$^2$·mmHg, the diffusive permeabilities remain unchanged. The filtration coefficients behave differently: the value for cytochrome c falls to 0.77 and that for albumin to 0.004. Reduction of the C5a complement activation reaches 70%. Tensile strength and elongation do not change significantly.

Example 6

When capillary membranes are used in dialyzer modules, it is important that they not be completely smooth; otherwise discrete bending can be observed, occurring at very short intervals. With smooth hollow fibers, there is the risk of sticking together and hence formation of skeins in the bundle. This effect leads to channel formation in the dialysate chamber and hence to a considerable loss of performance of the dialyzer.

The shaped hollow fiber on the other hand can be assembled safely to form loose uniformly-filled bundles, thus guaranteeing optimum dialyzer performance. This necessary looser bundling can also be obtained when the hollow fibers are applied to the outside of shapes that prevent contact, for example ribs directed outward and running lengthwise.

In conventional spinning using an air gap in free fall, manufacture of such ribs is possible only under very special conditions, but is readily possible in dip spinning from bottom to top as used here.

Immediate solidification of the spinning solution makes it possible to use any shapes in the casting slit and to keep the shapes in the cross section of the membrane wall.

In the example described here, a hollow fiber spinneret is used whose exit slit for the wall-forming spinning solution is provided at four uniformly distributed points on the outer circumference with outwardly directed, half-round bulges.

The total outlet cross section is 0.078 mm$^2$, the volume of spinning solution used is 5.0 ml/min and the outlet speed at the spinneret is 64.1 m/min. Nitrogen at 22 mbar (1.6 ml/min) is used as the internal filling. The speed of the first deflection is 52.1 m/min. The hollow fiber produced under these conditions in fact exhibits at its cross-sectional surface the desired shape of four ribs uniformly distributed around the circumference with rounded edges, 4–5 μm high, with a wall thickness of 9 μm on the free stretches of the membrane wall and an inside diameter of 198 μm. These dimensions as well as the shape described remain constant over any endless length to the desired degree. After leaving the dryer, bundles for test modules are made from the hollow fibers in such fashion that an additional change in the shape of the hollow fibers by pressure points was ruled out.

The bundles exhibit a loose structure with uniform distribution over the cross section of the bundle.

The dimensions of the test modules produced exhibit the following features:

Filling of dialysate chamber:completely problem-free

Channel formation: none observed

Ultrafiltration rate: 6.4 ml/min·m$^2$·mmHg

Clearance, urea: 172 ml/min±6.3

Clearance, creatinine: 161 ml/min±4.0

Clearance, vitamin $B_{12}$: 84 ml/min±1.8

$Q_B$=200 ml/min, $Q_D$=500 ml/min,

F=1 m$^2$, n=6

We claim:

1. Method for manufacturing a hollow fiber having a continuous internal cavity for dialysis comprising:

forcing a spinning solution of from about 4 to about 16 wt. % based on the weight of the solution of a polymer selected from the group consisting of cellulose, cellulose derivatives, chitin, chitin derivatives and mixtures thereof through a spinneret having an internal bore and located within a container filled with a dilute lye or a dilute acid while simultaneously forming the continuous internal cavity by forcing a fluid comprising a gas through the internal bore of the spinneret with a pressure differential of from about 100 to about 450 Pa relative to the sum of the static pressure and atmospheric pressure, causing a stream of coagulating solution to rise to the surface of the lye or acid, wherein the ratio of linear rise rate of the stream to escape speed from the spinneret is from about 0.90 to about 0.96; and conducting the stream of coagulating solution in the form of a hollow fiber over guide rollers through an alkaline, acid, or neutral washing bath.

2. Method according to claim 1 further comprising conducting the hollow fiber through a treatment bath.

3. Method according to claim 1, wherein the fluid forming the internal cavity comprises at least 80 vol. % of an inert gas and at most 20 vol. % of a gas reacting with the cellulose, a liquid influencing the surface structure of the internal cavity or both.

4. Method according to claim 3, wherein the fluid consists of at least 90 vol. % of an inert gas and at most 10 vol. % of a gas reacting with the cellulose, a liquid influencing the surface structure of the internal cavity or both.

5. Method according to claim 1, wherein the viscosity of the spinning solution is 500–1000 poise.

6. Method according to claim 1, wherein the spinneret located within the container dips into a thin layer of a non-coagulating liquid.

7. Method according to claim 1, wherein the fibers are stretched in a ratio of 1:1.1 to 1:1.5 before drying.

8. Method according to claim 1, wherein the fluid is a mixture of nitrogen and a member selected from the group consisting of ethylene oxide, propylene oxide and mixtures thereof.

9. Method according to claim 1, wherein the fluid is a mixture of nitrogen and a member selected from the group consisting of ethylene, propylene and mixtures thereof.

10. Method according to claim 1, wherein the fluid is a mixture of nitrogen and a member selected from the group consisting of acrylic acid, acrylate and mixtures thereof.

11. Method according to claim 1, wherein the fluid is a mixture of nitrogen and diisocyanate.

12. Method according to claim 1, wherein said fluid comprises at least one volatile liquid and air or nitrogen.

13. Method according to claim 12, wherein the at least one volatile liquid is a glycerine-alcohol mixture.

14. Method according to claim 1, wherein said fluid comprises a gas with a liquid finely distributed therein.

15. Method according to claim 14, wherein the finely distributed liquid consists of modified cellulose dissolved in a suitable solvent.

16. Method according to claim 14, wherein the gas with a liquid finely distributed therein is an aerosol.

17. Dialysis membrane from a regenerated cellulose first polymer in the form of a hollow fiber having a continuous longitudinal internal cavity essentially filled with a gas, the hollow fiber having a porous inner surface and an outer surface, wherein said hollow fiber is obtained by the method of claim 1.

18. Dialysis membrane according to claim 17, wherein the hollow fiber has a dry elongation of at least 50% and a wet elongation of at least 100%.

19. Dialysis membrane according to claim 17, wherein the regenerated cellulose first polymer is selected from the group consisting of modified cellulose, modified chitin and mixtures thereof.

20. Dialysis membrane according to claim 19, wherein the modified cellulose or modified chitin has a degree of substitution from about 0.02 to about 0.4.

21. Dialysis membrane according to claim 17, wherein the inner surface is formed from a second polymer, said second polymer being different from the first polymer.

22. Dialysis membrane according to claim 21, wherein the second polymer comprises a member selected from the group consisting of an acrylic monomer, an olefin, a diolefin and mixtures thereof.

23. Dialysis membrane according to claim 17, wherein a cross section of the hollow fiber perpendicular to the fiber axis is so arranged that the wall thickness of the hollow fiber along its circumference increases at least once continuously up to a maximum thickness and decreases up to a minimum thickness and wherein the average ratio of the maximum thickness to the minimum thickness is from about 2 to about 6.

24. Dialysis membrane according to claim 17, comprising at least two commonly spun hollow fibers connected to one another parallel to the hollow fiber axes.

25. Dialysis membrane according to claim 17, wherein the hollow fiber has at least one rib-shaped external thickening along the fiber axis.

26. Dialysis membrane comprising:
a regenerated cellulose first polymer in the form of a hollow fiber having a continuous longitudinal internal cavity filled essentially with a gas, said hollow fiber having a porous inner surface and an outer surface, wherein the outer surface is formed by a thin skin having fine lengthwise grooves and the inner surface is positively modified by physical and chemical means.

27. Dialysis membrane according to claim 26, wherein the hollow fiber exhibits a dry elongation of at least 50% and a wet elongation of at least 100%.

28. Dialysis membrane according to claim 26, wherein the regenerated cellulose first polymer is selected from the group consisting of a modified cellulose, a modified chitin, chitin and combinations thereof.

29. Dialysis membrane according to claim 28, wherein the degree of substitution of the modified cellulose or the modified chitin is from about 0.02 to about 0.4.

30. Dialysis membrane according to claim 26, wherein the inner surface is formed by a second polymer, said second polymer being different from the first polymer.

31. Dialysis membrane according to claim 30, wherein the second polymer comprises a member selected from the group consisting of an acrylic monomer, an olefin, a diolefin and mixtures thereof.

32. Dialysis membrane according to claim 26, wherein a cross section of the hollow fiber perpendicular to the fiber axis is so formed that the wall thickness of the hollow fiber increases continuously along its circumference at least once up to a maximum thickness and decreases to a minimum thickness and wherein the average of the ratio of the maximum thickness to the minimum thickness is from about 2 to about 6.

33. Dialysis membrane according to claim 26, wherein the membrane comprises at least two commonly spun hollow fibers connected to one another parallel to the hollow fiber axes.

34. Dialysis membrane according to claim 26, wherein the hollow fiber has at least one rib-shaped external thickening along the fiber axis.

35. A method for manufacturing a hollow fiber having a continuous internal cavity for dialysis comprising:

forcing a spinning solution selected from the group consisting of cellulose, cellulose derivatives, chitin, chitin derivatives and mixtures thereof through a spinneret, having an internal bore and located within a container filled with a dilute lye or dilute acid, while simultaneously forming a continuous internal cavity by forcing a fluid comprising a gas through the internal bore of the spinneret causing a stream of coagulating solution to rise to the surface of the lye or acid; and conducting the stream of coagulating solution in the form of a hollow fiber over guide rollers through an akaline, acid, or neutral washing bath;

said fluid comprising a gas having a component that chemically reacts with the polymer of the hollow fiber.

36. A dialysis membrane manufactured by the method of claim 35.